United States Patent
Yoo et al.

(10) Patent No.: US 9,710,068 B2
(45) Date of Patent: *Jul. 18, 2017

(54) APPARATUS AND METHOD FOR CONTROLLING INTERFACE

(71) Applicant: SAMSUNG ELECTRONICS CO., LTD., Suwon-si (KR)

(72) Inventors: Byung In Yoo, Seoul (KR); Chang Kyu Choi, Seongnam-si (KR); Jae Joon Han, Seoul (KR); Du Sik Park, Suwon-si (KR); Hee Seob Ryu, Osan-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/842,448

(22) Filed: Sep. 1, 2015

(65) Prior Publication Data

US 2015/0370337 A1 Dec. 24, 2015

Related U.S. Application Data

(63) Continuation of application No. 13/212,838, filed on Aug. 18, 2011, now Pat. No. 9,141,189.

(30) Foreign Application Priority Data

Aug. 26, 2010 (KR) ......................... 10-2010-0082848
May 17, 2011 (KR) ......................... 10-2011-0046174

(51) Int. Cl.
*G06T 7/11* (2017.01)
*G06F 3/01* (2006.01)
(Continued)

(52) U.S. Cl.
CPC .............. *G06F 3/017* (2013.01); *G06F 3/012* (2013.01); *G06F 3/013* (2013.01); *G06F 3/0304* (2013.01);
(Continued)

(58) Field of Classification Search
None
See application file for complete search history.

(56) References Cited

U.S. PATENT DOCUMENTS 6,243,054 B1   6/2001  DeLuca
6,559,813 B1   5/2003  DeLuca et al.
(Continued)

FOREIGN PATENT DOCUMENTS

JP    2009-146333        7/2009
KR    10-2006-0031600 A  4/2006
(Continued)

OTHER PUBLICATIONS

Fehn, Christoph, and R.S. Pastoor. "Interactive 3-DTV-concepts and key technologies." Proceedings of the IEEE 94.3, p. 524-538 (2006).
(Continued)

*Primary Examiner* — Ryan M Gray
(74) *Attorney, Agent, or Firm* — NSIP Law

(57) ABSTRACT

In an apparatus and method for controlling an interface, a user interface (UI) may be controlled using information on a hand motion and a gaze of a user without separate tools such as a mouse and a keyboard. That is, the UI control method provides more intuitive, immersive, and united control of the UI. Since a region of interest (ROI) sensing the hand motion of the user is calculated using a UI object that is controlled based on the hand motion within the ROI, the user may control the UI object in the same method and feel regardless of a distance from the user to a sensor. In addition,
(Continued)

since positions and directions of view points are adjusted based on a position and direction of the gaze, a binocular 2D/3D image based on motion parallax may be provided.

19 Claims, 14 Drawing Sheets

(51) Int. Cl.
*G06F 3/0481* (2013.01)
*G06F 3/0484* (2013.01)
*G06F 3/0485* (2013.01)
*G06F 3/03* (2006.01)
*G06F 3/0486* (2013.01)
*H04N 5/232* (2006.01)

(52) U.S. Cl.
CPC .......... *G06F 3/0485* (2013.01); *G06F 3/0486* (2013.01); *G06F 3/04815* (2013.01); *G06F 3/04845* (2013.01); *G06T 7/11* (2017.01); *H04N 5/23229* (2013.01); *G06F 2203/04806* (2013.01); *G06T 2207/10004* (2013.01)

(56) References Cited

U.S. PATENT DOCUMENTS

| | | | |
|---|---|---|---|
| 7,705,876 | B2 | 4/2010 | Starkweather et al. |
| 7,883,415 | B2 | 2/2011 | Larsen et al. |
| 7,898,522 | B2 | 3/2011 | Hildreth et al. |
| 8,230,367 | B2 | 7/2012 | Bell et al. |
| 8,487,871 | B2 | 7/2013 | Langridge et al. |
| 8,659,658 | B2 | 2/2014 | Vassigh et al. |
| 2004/0135744 | A1 | 7/2004 | Bimber et al. |
| 2004/0242988 | A1 | 12/2004 | Niwa et al. |
| 2005/0059488 | A1 | 3/2005 | Larsen et al. |
| 2006/0038881 | A1 | 2/2006 | Starkweather et al. |
| 2008/0030460 | A1 | 2/2008 | Hildreth et al. |
| 2009/0077504 | A1* | 3/2009 | Bell .................. G06F 3/011 715/863 |
| 2012/0030637 | A1 | 2/2012 | Dey et al. |
| 2012/0050273 | A1 | 3/2012 | Yoo et al. |

FOREIGN PATENT DOCUMENTS

KR 10-2007-0060885 A 6/2007
KR 10-2009-0045938 A 5/2009

OTHER PUBLICATIONS

Introduction to U.S. Pat. No. 6,243,054 and U.S. Pat. No. 6,559,813 by Michael J. DeLuca, entitled, "Offering Pioneering Patents: Stereoscopic User Interface & Augmented Reality Headset" p. 1-14 (received by Applicant's representative on Jul. 28, 2012).
Korean Office Action issued on Mar. 31, 2017 in corresponding Korean Patent Application No. 10-2011-0046174 (6 pages, in Korean with English Translation).

* cited by examiner

APPARATUS AND METHOD FOR CONTROLLING INTERFACE

CROSS-REFERENCE TO RELATED APPLICATIONS

This application is a Continuation of U.S. patent application Ser. No. 13/212,838 filed on Aug. 18, 2011, which claims the benefit of Korean Patent Application Nos. 10-2010-0082848, filed on Aug. 26, 2010, and 10-2011-0046174 filed on May 17, 2011, in the Korean Intellectual Property Office, the disclosure of which is incorporated herein by reference.

BACKGROUND

1. Field

Example embodiments relate to an apparatus and method for controlling an interface, and more particularly, to an apparatus and method for controlling a 2-dimensional or 3-dimensional graphic user interface (2D/3D GUI).

2. Description of the Related Art

Recently, a natural interface technology has been on the rise. A natural interface enables more natural and intuitive communication between a person and a computer. Active research is underway to recognize a user's intention and motion and therefore achieve interactive communication between the person and the computer. In particular, an interactive display is being rapidly developed to provide a more natural computing environment than a keyboard and a mouse which are typical user interfaces (UI).

According to conventional interactive displays, a UI may be operated by multi-touch and hover performed on a surface of the display. Whereas the mouse and the keyboard provide an indirect interaction where a gaze and an operation space of the user do not correspond to each other, the multi-touch and hover enables a direct interaction where the gaze and the operation space correspond to each other, thereby achieving a more natural operation. However, the multi-touch method provides only a 2-dimensional (2D) interaction applicable only on a displaying surface. That is, when an operation object of the UI is 3D, the object may not be intuitively operated as though the user were manipulating an actual object. In case of the hover method, the object may not be operated immersively and unitedly only by information regarding the hand of the user.

Currently, a display apparatus providing 3D images is widely used. A person may perceive a 3D image by a stereoscopic method that inputs images to both left and right eyes and a motion parallax method that varies a distance of an object and a horizontal movement of left and right images according to a person's point of view. Demand for the 3D image are steadily increasing.

Accordingly, a 3D user interface (3D UI) providing a more immersive feel and sense of unity, and an improved apparatus and method for controlling the 3D UI is desired.

SUMMARY

Additional aspects and/or advantages will be set forth in part in the description which follows and, in part, will be apparent from the description, or may be learned by practice of the invention.

The foregoing and/or other aspects are achieved by providing an interface control apparatus comprising a receiver to receive image information including a depth image related to a user from a sensor; a processor to generate, based on the image information, at least one of motion information regarding a hand motion of the user and gaze information regarding a gaze of the user; and a controller to control a 2-dimensional or 3-dimensional graphical user interface (2D/3D GUI) based on at least one of the motion information and the gaze information.

The foregoing and/or other aspects are achieved by providing an interface control method comprising receiving image information including a depth image related to a user from a sensor, generating, based on the image information, at least one of motion information regarding a hand motion of the user and gaze information regarding a gaze of the user; and controlling a 2D/3D GUI based on at least one of the motion information and the gaze information.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
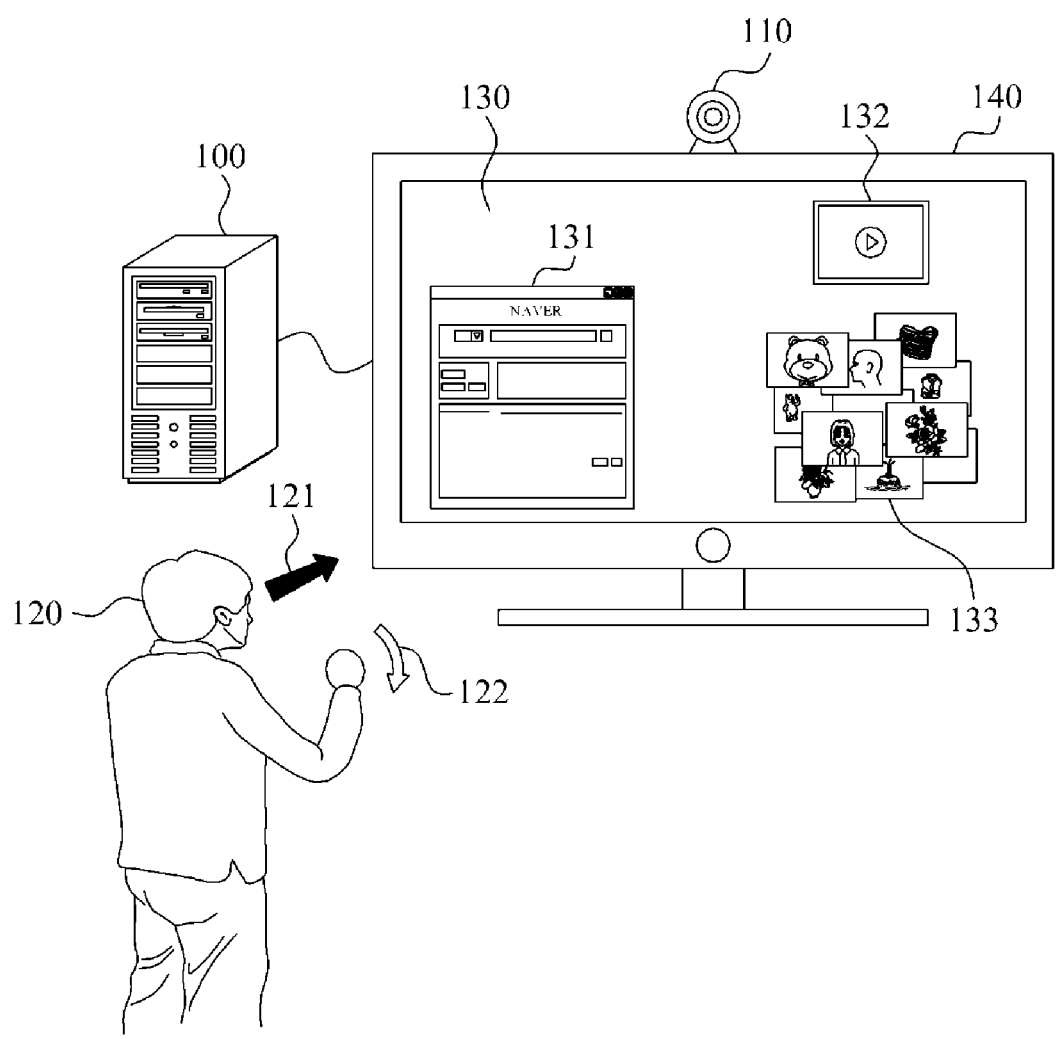
FIG. 1 illustrates an interface control system according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates an interface control system according to example embodiments.

Referring to FIG. 1, the interface control system includes an interface control apparatus 100, a sensor 110, and a display apparatus 140.

The sensor 110 senses an image related to a user 120. The sensor according to an embodiment may be a camera, for example. The sensor 110 may take a depth image regarding a distance from the sensor 110 to the user 120 and transmit image information including the depth image to the interface control apparatus 100.

Depending on embodiments, the sensor 110 may further take a color image, or an IR image, or both, related to a user and transmit image information further including the color image and the IR image to the interface control apparatus 100.

The interface control apparatus 100 receives the image information related to the user 120 from the sensor 110. Based on the received image information, the interface control apparatus 100 may generate motion information regarding a motion of the hand 122 of the user 120.

According to an embodiment, the motion information may include information including one or more of, or any combination thereof, of a motion path of the hand 122 of the user 120, for example regarding whether the hand 122 is moving upward or downward, a posture of the hand 122, for example regarding whether the hand 122 is in an opened state and a closed state, and the number of the hand 122, for example regarding whether one hand 122 or both hands 122 are used.

The interface control apparatus 100 may generate gaze information regarding a gaze 121 of the user 120, based on the received image information.

The gaze information according to an embodiment may include one or more of, or any combination thereof, of a direction of the gaze 121, a position reached by the gaze 121, and a position of a head of the user.

The interface control apparatus 100 controls a 2-dimensional or 3-dimensional graphical user interface (2D/3D GUI) 130 based on the motion information. The 2D/3D GUI 130 may display at least one UI object, for example, UI objects 131, 132, and 133.

Depending on embodiments, when a position of the hand 122 may correspond to a position of a web browser UI object 131 of the 2D/3D GUI 130 and when the motion of the hand 122 corresponds to a motion of dragging the web browser UI object 131, that is, a drag interaction, the interface control apparatus 100 may control the 2D/3D GUI 130 so that the web browser UI object 131 is dragged in a moving direction of the hand 122.

The interface control apparatus 100 may generate the 2D/3D GUI 130 based on the image information. In addition, the interface control apparatus 100 may output the generated 2D/3D GUI 130 to the display apparatus 140.

The display apparatus 140 may include a 2D/3D projector, a 2D/3D TV, and the like. According to an embodiment, the display apparatus 140 may output a 2D/3D image by being input with a 2D/3D image transmission format such as Dual FHD, Side by Side, Up and Down, Horizontal Interlace, Vertical Interlace, and the like.

Figure 2:
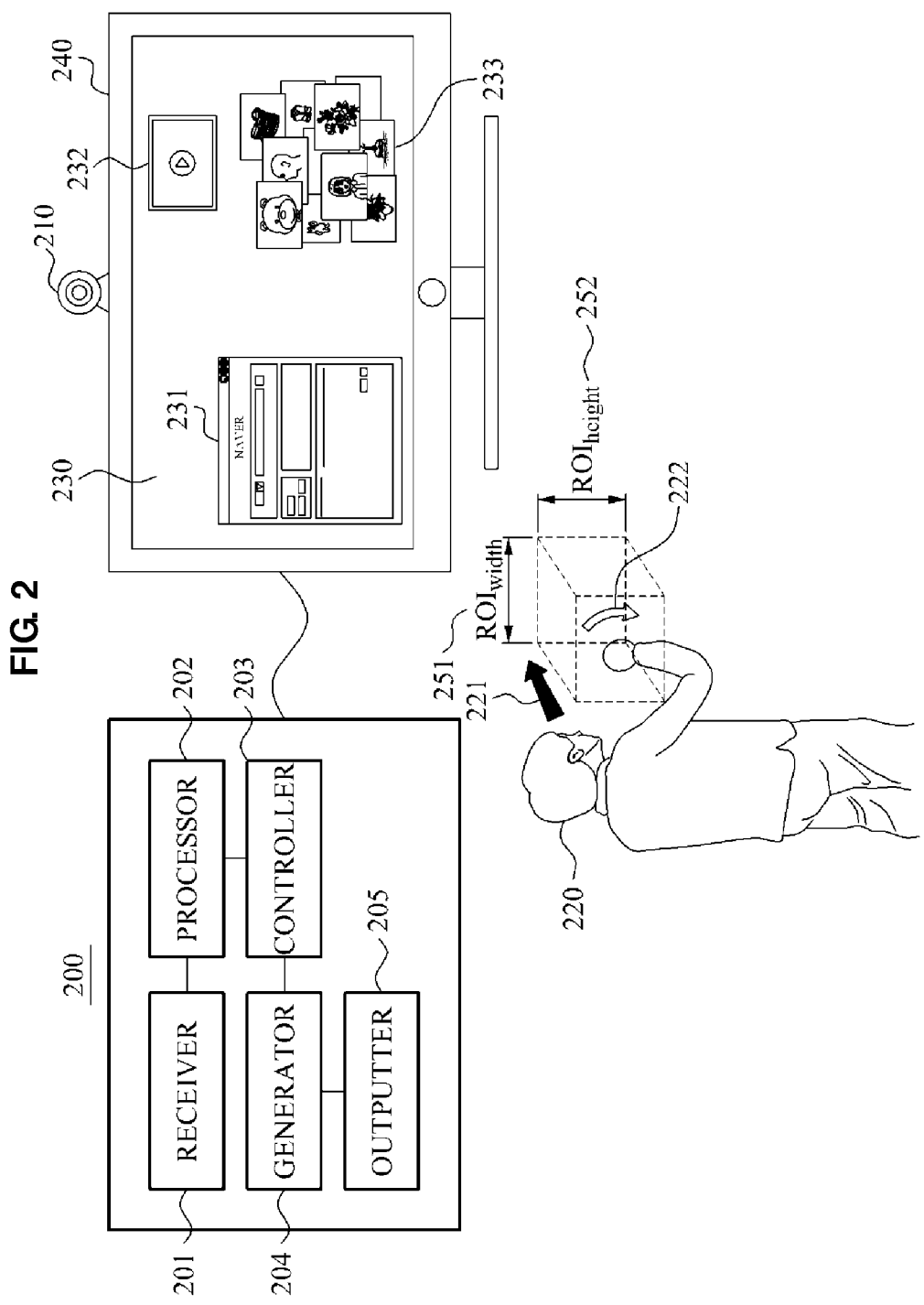
FIG. 2 illustrates a structure of an interface control apparatus according to example embodiments.

FIG. 2 illustrates a structure of an interface control apparatus 200 according to example embodiments.

Referring to FIG. 2, the interface control apparatus 200 includes a receiver 201, a processor 202, and a control 203.

The receiver 201 receives image information including a depth image related to a user 220 from a sensor 210.

The processor 202 generates at least one of motion information related to a motion of a hand 222 of the user 220 and gaze information related to a gaze 221 of the user 220, based on the image information.

The processor 202 may analyze the received image information, thereby recognizing the motion of the hand 222, and generate the motion information related to the motion of the hand 222.

Depending on embodiments, the processor 202 may extract information on a posture of the hand 222 from the image information using the mean shift. In addition, the processor 202 may extract information on the posture of the hand 222 from the image information using ADABOOST (ADAPTIVE BOOSTING)-based shape matching which features a hue moment according to a level set. The processor 202 may extract information on a motion path of the hand 222 from the image information using a mean square error (MSE) process.

According to an aspect of the invention, the processor 202 may calculate a region of interest (ROI) 250 based on the received image information. In addition, the processor 202 may generate the motion information regarding the motion of the hand 222 within the range of the calculated ROI 250.

The processor 202 may generate the ROI 250 corresponding to the position of the hand 222 when control of a 2D/3D GUI 230 starts.

When the same ROI 250 is necessary regardless of a position of the user 220, the ROI 250 indicates a partial region of the image received from the sensor 210 for generating the motion information regarding the motion of the hand 222. Depending on embodiments, the processor 202 may not generate the motion information regarding the motion of the hand 222 performed out of the ROI 250. The ROI 205 will be more specifically explained with reference to FIG. 3.

In the following description beginning with FIG. 3, interface control apparatus 200 of FIG. 2 is presented as an example embodiment. However, the present invention is not limited to interface control apparatus 200, as other example embodiments of the interface control apparatus, including interface control apparatus 100 of FIG. 1 and additional embodiments of the interface control apparatus, could also be used.

Figure 3:
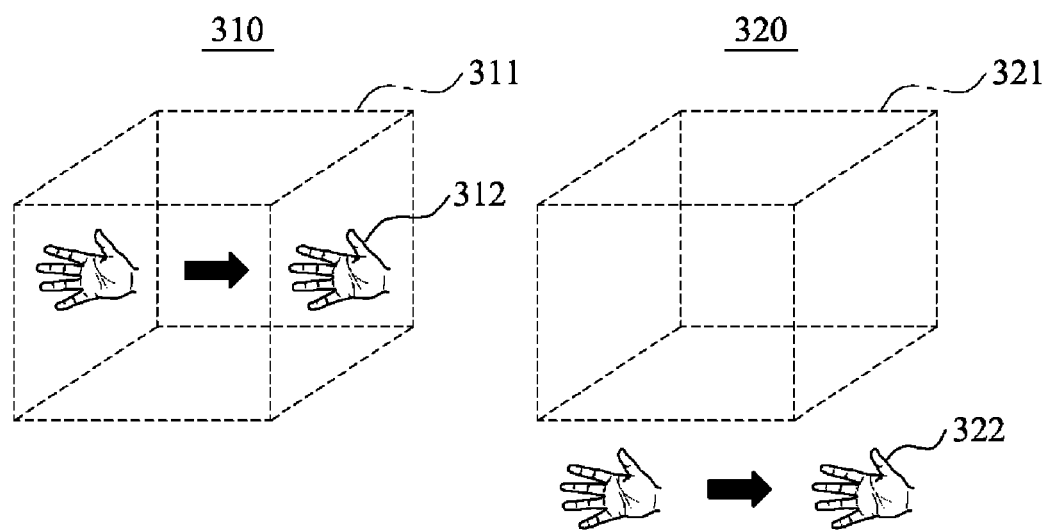
FIG. 3 illustrates a region of interest (ROI) according to example embodiments.

FIG. 3 illustrates an ROI according to example embodiments.

Referring to FIG. 3, a hand 312 of a user moves within an ROI 311 in a first case 310 while a hand 322 of a user moves out of an ROI 321 in a second case 320.

In the first case 310, the interface control apparatus 200 may generate motion information regarding a motion of the hand 312. For example, the interface control apparatus 200 may analyze the image information, thereby recognizing the hand 312 is moving from the left to the right, and accordingly generate the motion information regarding the motion of the hand 312 moving from the left to the right.

In the second case 320, the interface control apparatus 200 may not generate the motion information regarding a motion of the hand 322. More specifically, when the interface control apparatus 200 recognizes that the hand 322 is moving out of the ROI 321 as a result of analysis of the image information, the interface control apparatus 200 may not generate the motion information regarding the motion of the hand 322. In this case, control of the 2D/3D GUI is not performed since there is no motion information.

Referring back to FIG. 2, the processor 202 may calculate the ROI 250 by calculating a width ($ROI_{width}$) 251 of the ROI 250 and a height ($ROI_{height}$) 252 of the ROI 250.

The processor 202 may calculate the width 251 of the ROI 250 using Equations 1. In addition, the processor 202 may calculate the height 252 of the ROI 250 using Equations 2.

$$ROI_{width(pixel)} = \frac{K_{width(cm)} \times \text{image}_{width(pixel)}}{D_{cur(cm)} \times \tan(FoV_{width(\theta)})} \quad \text{[Equation 1]}$$

$$ROI_{height(pixel)} = \frac{K_{height(cm)} \times \text{image}_{height(pixel)}}{D_{cur(cm)} \times \tan(FoV_{height(\theta)})} \quad \text{[Equation 2]}$$

$D_{cur}$ is the distance in centimeter between camera and the user.

Image$_{width}$ and Image$_{height}$ are the width and the height of the depth image in pixel.

FoV$_{width}$ and FoV$_{height}$ are the width and the height of the field of view due to the lens of the depth camera.

K$_{width}$ is the average width of ROI window and K$_{height}$ is the average height of ROI window in the air.

According to an aspect of the invention, the processor 202 may calculate a depth difference value between a current frame and at least one previous frame of the depth image, and generate the motion information based on the calculated depth difference value. Hereinafter, generation of the motion information using the depth image will be described in detail with reference to FIG. 4.

Figure 4:
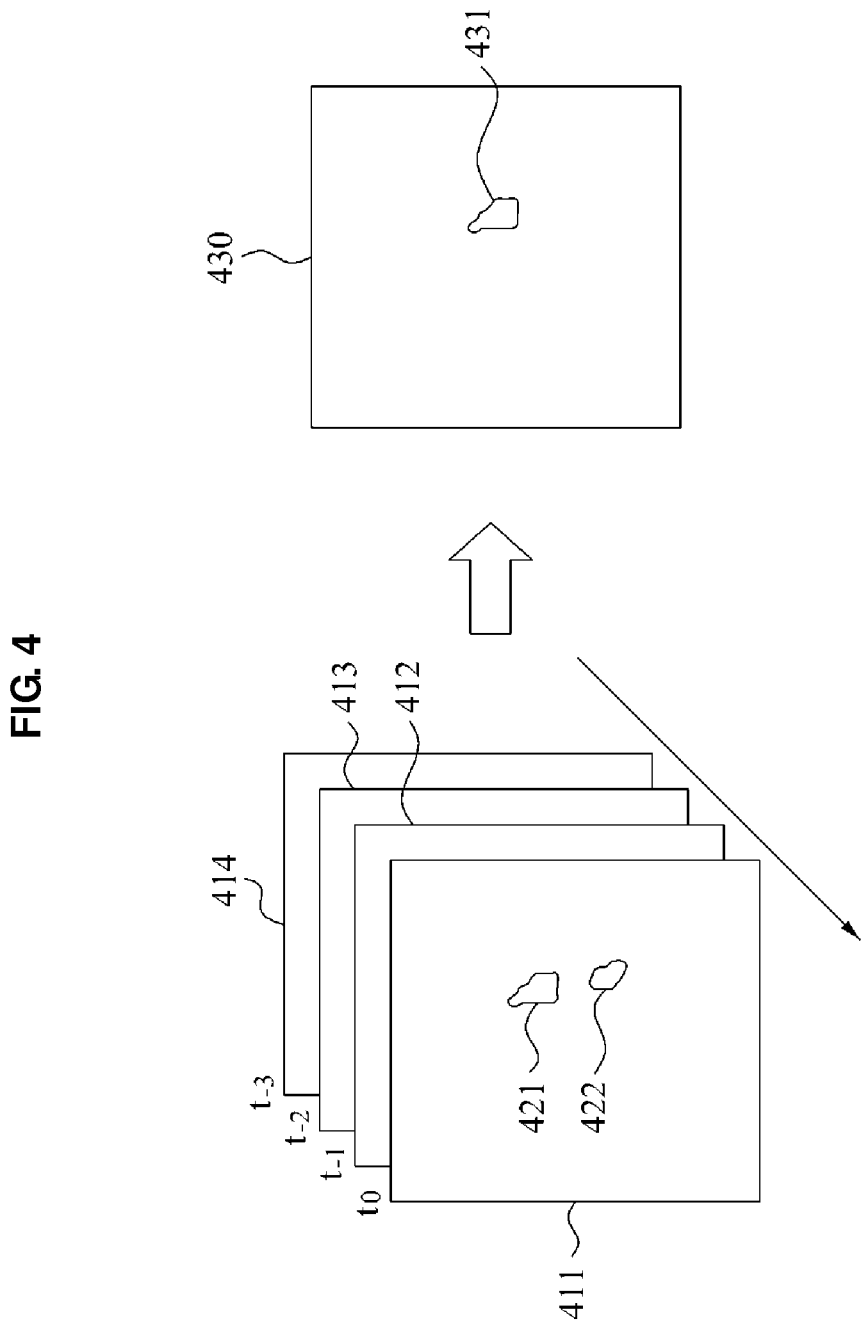
FIG. 4 illustrates a depth image according to example embodiments.

FIG. 4 illustrates a depth image according to example embodiments.

Referring to FIG. 4, the depth image may include a plurality of frames 411, 412, 413, and 414. A current frame 411 denotes the depth image at a present time 't' whereas at least one previous frame, that is, previous frames 412, 413, and 414 denote the depth image of before the present time 't.'

The interface control apparatus 200 may calculate the depth difference value between the current frame 411 and the previous frames 412, 413, and 414. For example, the interface control apparatus 200 may calculate a first depth difference value between the current frame 411 and the previous frame 412, calculate a second depth difference value between the current frame 411 and the previous frame 413, and calculate a depth difference value between the current frame 411 and the previous frame 414.

The interface control apparatus 200 may extract, from the calculated depth difference value, a region of pixels where the depth difference value exceeds a reference value. For example, the interface control apparatus 200 may extract a first region with respect to pixels where the depth difference value exceeds the reference value from the first depth difference value, extract a second region with respect to pixels where the depth difference value exceeds the reference value from the second depth difference value, and extract a third region with respect to pixels where the depth difference value exceeds the reference value from the third depth difference value.

When a plurality of regions exist with respect to the pixels where the depth difference value exceeds the reference value, the interface control apparatus 200 may extract pixels 431 forming an intersection from the plurality of regions. For example, the interface control apparatus 200 may extract pixels belonging to all of the first region, the second region, and the third region.

The interface control apparatus 200 may generate the motion information by analyzing the pixels forming the intersection. The interface control apparatus 200 may generate the motion information further taking into consideration at least one of an aspect ratio, an image size, and a moment vector direction. For example, when the depth difference is decreasing as a result of analysis of the pixels belonging to all of the first, the second, and the third regions, this means that a distance between the sensor and the user is decreasing. Therefore, the interface control apparatus 200 may recognize a motion of the user, the motion of extending the hand forward, and accordingly generate the motion information regarding the motion.

Referring back to FIG. 2, the controller 203 controls the 2D/3D GUI 230 based on at least one of the motion information and the gaze information.

The 2D/3D GUI 230 may display at least one UI object, for example, UI objects 231, 232, and 233.

In case that the position of the hand 222 corresponds to a position of a motion picture replaying UI object 232 of the 2D/3D GUI 230 and, in addition, the motion of the hand 222 corresponds to a motion of playing the motion picture replaying UI object 232, that is, a play interaction, the controller 203 may control the 2D/3D GUI 230 such that the motion picture replaying UI object 232 is replayed.

The controller 203 may start or end controlling the 2D/3D GUI 230 in accordance with the control start interaction signaling start of the control of the 2D/3D GUI 230 and the control end interaction signaling end of the control of the 2D/3D GUI 230.

In other words, when the motion information corresponds to the control start interaction, the controller 203 may start controlling the 2D/3D GUI 230. When the motion information corresponds to the control end interaction, the controller 203 may end controlling the 2D/3D GUI 230.

Hereinafter, the control start interaction and the control end interaction will be described in further detail with reference to FIG. 5.

Figure 5:
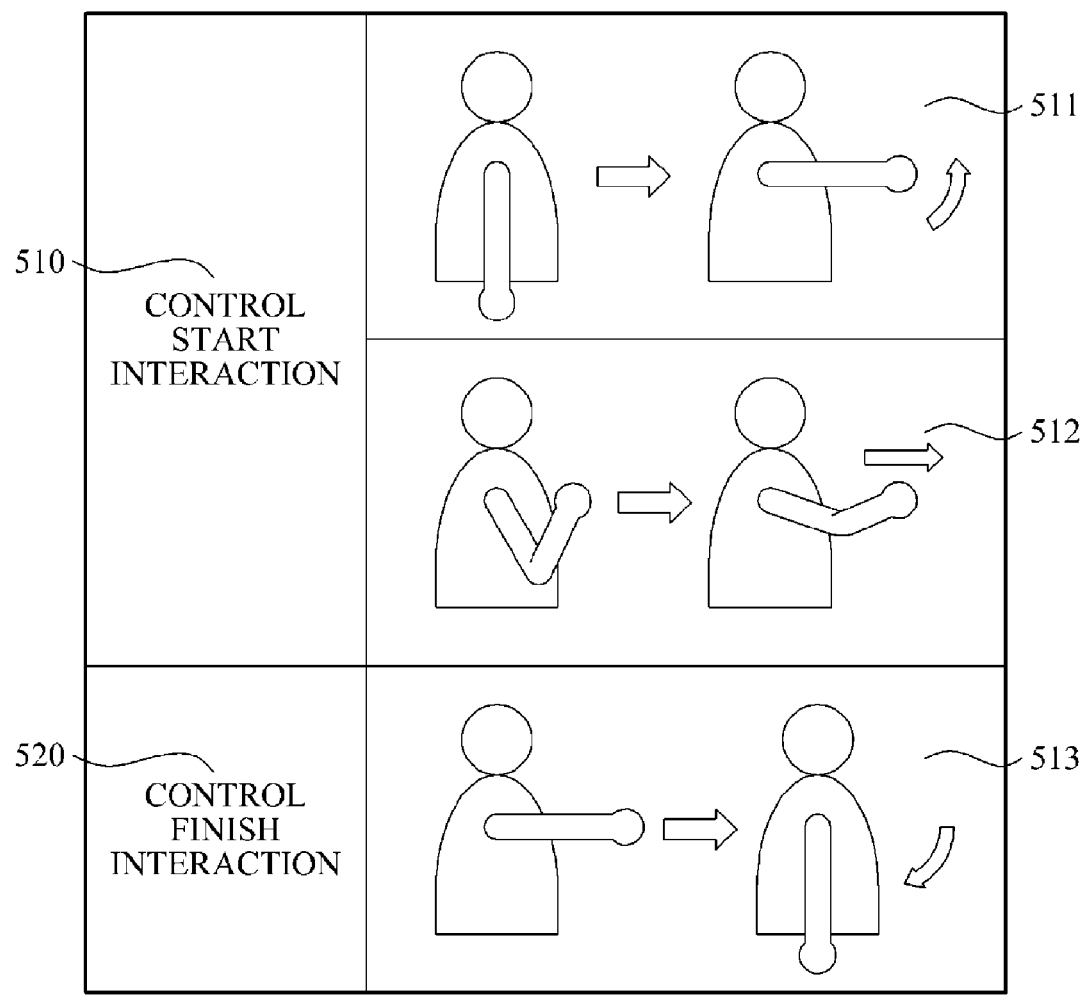
FIG. 5 illustrates a control start interaction and a control end interaction according to example embodiments.

FIG. 5 illustrates a control start interaction 510 and a control end interaction 520 according to example embodiments.

Referring to FIG. 5, the control start interaction 510 and the control end interaction 520 are shown in Table 500.

The control start interaction 510 may include at least one of a hand raising motion 511 and a hand extending motion 512 of the user.

For example, when the hand raising motion 511 is recognized as a result of analysis of the image information, the interface control apparatus 200 may generate the motion information related to the hand raising motion 511. Here, since the motion information corresponds to the control start interaction 510, the interface control apparatus 200 may start controlling the 2D/3D GUI. Depending on embodiments, when the motion information corresponds to the control start interaction 510, the interface control apparatus 200 may generate the ROI in a position of a hand of the user and start controlling the 2D/3D GUI according to the motion information regarding the hand motion within the ROI.

The control end interface 520 may include a hand lowering motion 521 of the user.

For example, when the hand lowering motion 512 is recognized as a result of analysis of the image information, the interface control apparatus 200 may generate the motion information related to the hand lowering motion 512. Here, since the motion information corresponds to the control end interaction 520, the interface control apparatus 200 may end controlling the 2D/3D GUI.

Referring back to FIG. 2, the interface control apparatus 200 may further include a database (not shown).

The database may store a plurality of interactions for controlling the 2D/3D GUI 230.

When any of the plurality of interactions corresponds to the motion information, the controller 203 may control movement of a control point of the 2D/3D GUI 230 based on the interaction corresponding to the motion information.

In addition, when no interaction corresponds to the motion information out of the plurality of interactions, the controller 203 may control the movement of the control point of the 2D/3D GUI 230 based on the motion information.

Hereinafter, an interaction according to example embodiments will be described in detail.

Figure 6:
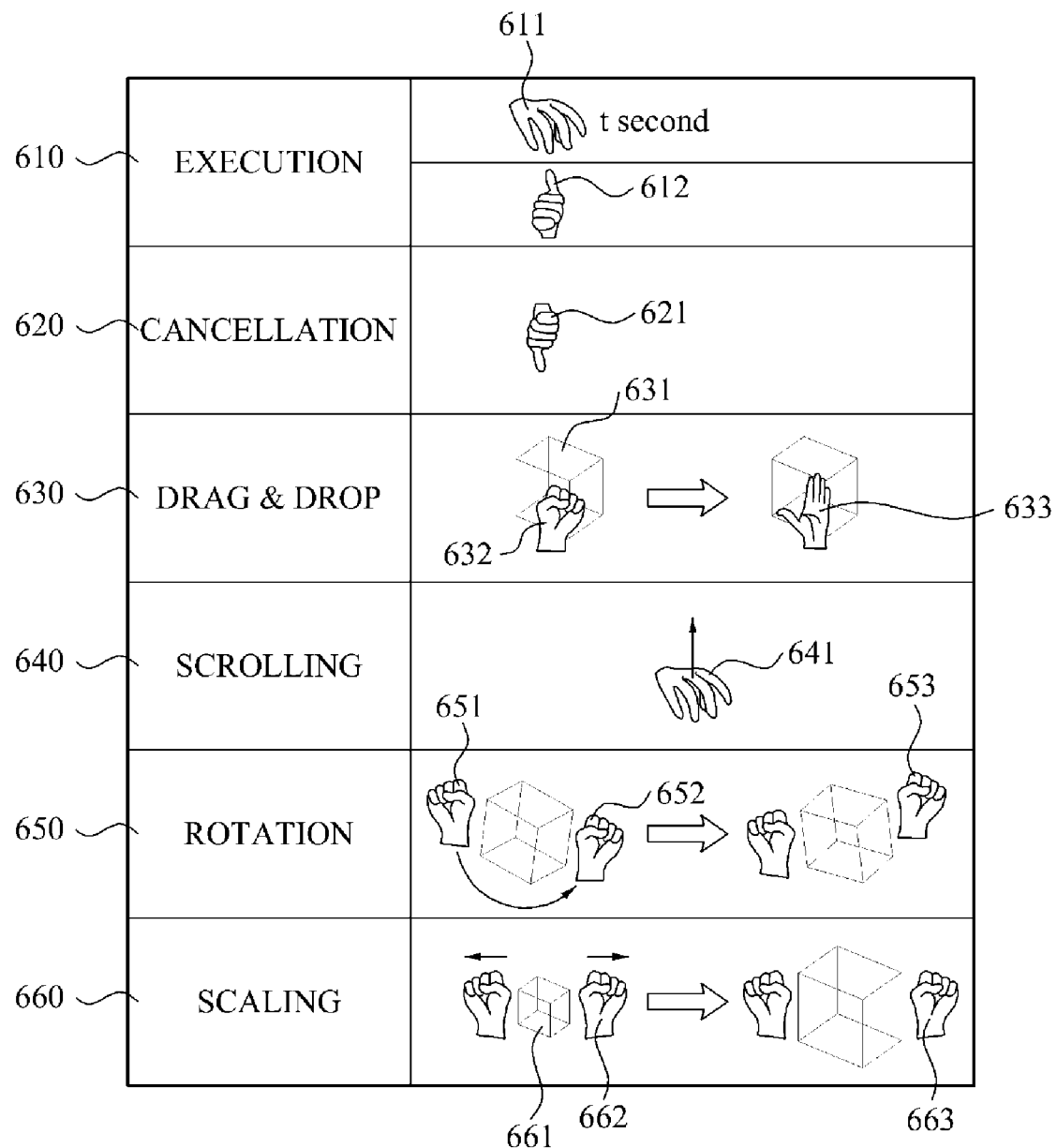
FIG. 6 illustrates various interactions according to example embodiments.

FIG. 6 illustrates various interactions according to example embodiments.

Referring to FIG. 6, a plurality of interactions 610, 620, 630, 640, 650, and 660 are illustrated as a table.

The plurality of interactions may include at least one of an execution interaction 610, a cancel interaction 620, a drag-and-drop interaction 630, a scrolling interaction 640, a rotation interaction 650, and a scaling interaction 660.

The execution interaction 610 may include at least one of a stopped motion 611 wherein a hand of the user stays stopped for a predetermined time (t seconds) and a thumb-up motion 612 wherein the hand is in a thumb-up posture.

For example, as a result of analyzing the image information, when the stopped motion 611 of the hand is recognized, the interface control apparatus 200 may generate the motion information related to the stopped motion 611 where the hand stays stopped for the predetermined time. Here, since the motion information corresponds to the execution interaction 610, the interface control apparatus 200 may control the 2D/3D GUI based on the motion information. Specifically, the interface control apparatus 200 may control the 2D/3D GUI such that a UI object corresponding to the position of the hand, out of at least one UI object on the 2D/3D GUI, is executed.

For another example, as a result of analyzing the image information, when the thumb-up motion 612 of the hand is recognized, the interface control apparatus 200 may generate the motion information related to the thumb-up motion 612 where the hand is in the thumb-up posture. Here, since the motion information corresponds to the execution interaction 610, the interface control apparatus 200 may control the 2D/3D GUI based on the motion information. Specifically, the interface control apparatus 200 may control the 2D/3D GUI such that a UI object corresponding to the position of the hand, out of at least one UI object on the 2D/3D GUI, is executed.

According to an embodiment, the cancel interaction 620 may include a thumb-down motion 621 of the hand of the user.

For example, as a result of analyzing the image information, when the thumb-down motion 621 of the hand is recognized, the interface control apparatus 200 may generate the motion information related to the thumb-down motion 621 where the hand is in the thumb-down posture. Here, since the motion information corresponds to the cancel interaction 620, the interface control apparatus 200 may control the 2D/3D GUI based on the motion information. Specifically, the interface control apparatus 200 may control the 2D/3D GUI such that a UI object corresponding to the position of the hand, out of at least one UI object on the 2D/3D GUI, is cancelled.

The drag-and-drop interaction 630 may include a series of motions of the hand, that is, a hand closing motion 632, a closed-hand moving motion, and a hand opening motion 633.

For example, as a result of analyzing the image information, when the series of motions including the hand closing motion 632, the closed-hand moving motion, and the hand opening motion 633 are recognized, the interface control apparatus 200 may generate the motion information regarding the series of motions. Here, since the motion information corresponds to the drag-and-drop interaction 630, the interface control apparatus 200 may control the 2D/3D GUI based on the motion information. Specifically, the interface control apparatus 200 may control the 2D/3D GUI such that a UI object 631 corresponding to the position of the hand, out of at least one UI object on the 2D/3D GUI, is moved to where the hand is opened.

The scrolling interaction 640 may include a fast hand moving motion 641 wherein the user moves the hand faster than a predetermined reference speed.

For example, when the fast hand moving motion 641 is recognized as a result of analyzing the image information, the interface control apparatus 200 may generate the motion information regarding the fast hand moving motion 641 wherein the user moves the hand faster than the reference speed. Here, since the motion information corresponds to the scrolling interaction 640, the interface control apparatus 200 may control the 2D/3D GUI based on the motion information. Specifically, the interface control apparatus 200 may control the 2D/3D GUI such that a UI object corresponding to the position of the hand, out of at least one UI object on the 2D/3D GUI, is scrolled in a direction of moving the hand.

The rotation interaction 650 may include a series of motions of hands of the user, that is, a hands closing motion 652 wherein the user closes both hands and a hands rotating motion 653 wherein the user rotates both closed hands.

For example, when the series of motions including the hands closing motion 652 and the hands rotating motion 653 are recognized as a result of analyzing the image information, the interface control apparatus 200 may generate the motion information regarding the series of motions. Here, since the motion information corresponds to the rotation interaction 650, the interface control apparatus 200 may control the 2D/3D GUI based on the motion information. Specifically, the interface control apparatus 200 may control the 2D/3D GUI such that a UI object 651 corresponding to the position of the hand, out of at least one UI object on the 2D/3D GUI, is rotated by an angle by which the closed hands are rotated.

The scaling interaction 660 may include a series of motions of the hands, that is, a hands closing motion 662 wherein the user closes both hands and a hands separating motion 663 wherein the user separates both closed hands from each other. In addition, the scaling interaction 660 may include a series of motions including the hands closing motion 663 and a hands collecting motion wherein the user moves both closed hands toward each other.

For example, when the series of motions including the hands closing motion 662 and the hands separating motion 663 or including the hands closing motion 662 and the hands collecting motion are recognized as a result of analyzing the image information, the interface control apparatus 200 may generate the motion information regarding the series of motions. Here, since the motion information corresponds to the scaling interaction 660, the interface control apparatus 200 may control the 2D/3D GUI based on the motion information. Specifically, the interface control apparatus 200 may control the 2D/3D GUI such that a UI object 661 corresponding to the position of the hand of the user, out of at least one UI object on the 2D/3D GUI, is size-transformed, that is, enlarged or reduced by a distance by which the closed hands are separated or collected.

Although the present embodiment has been explained in such a manner that the plurality of interactions include the execution interaction 610, the cancel interaction 620, the drag-and-drop interaction 630, the scrolling interaction 640, the rotation interaction 650, and the scaling interaction 660, the present invention is not limited to the embodiment.

Referring back to FIG. 2, when the motion information corresponds to a high precision interaction, the controller 203 may display an operation region corresponding to the motion information. In addition, the controller 203 may control the 2D/3D GUI 230 within the operation region.

According to an embodiment, the controller 203 may define a control range of the 2D/3D GUI 230 as a predetermined region rather than the entire 2D/3D GUI 230. Here, the operation region denotes the predetermined region within which the control range is limited.

Depending on embodiments, the controller 203 may indicate the operation region by displaying the other region but the operation region in the 2D/3D GUI 230 in a dark color. Alternatively, the controller 203 may indicate the operation region by enlarging the operation region to a predetermined size.

The high precision interaction may include a motion of the user 220 of moving both hands to a front of the user 220 and a motion of the user 220 of stopping any one of both hands for longer than a reference time.

For example, as a result of analyzing the image information, when the motions including moving both hands to the front of the user 220 and stopping either hand for longer than the reference time are recognized, the processor 202 may generate the motion information regarding the motions. Here, since the motion information corresponds to the high precision interaction, the controller 203 may control the 2D/3D GUI 230. Specifically, the controller 203 may control the 2D/3D GUI such that a region of the 2D/3D GUI, corresponding to a position of one hand of the user stopped longer than the reference time, is displayed as an adjustment region and that a control point within the adjustment region is moved corresponding to a position of the other hand.

Hereinafter, the high precision interaction will be described in detail with reference to FIG. 7.

Figure 7:
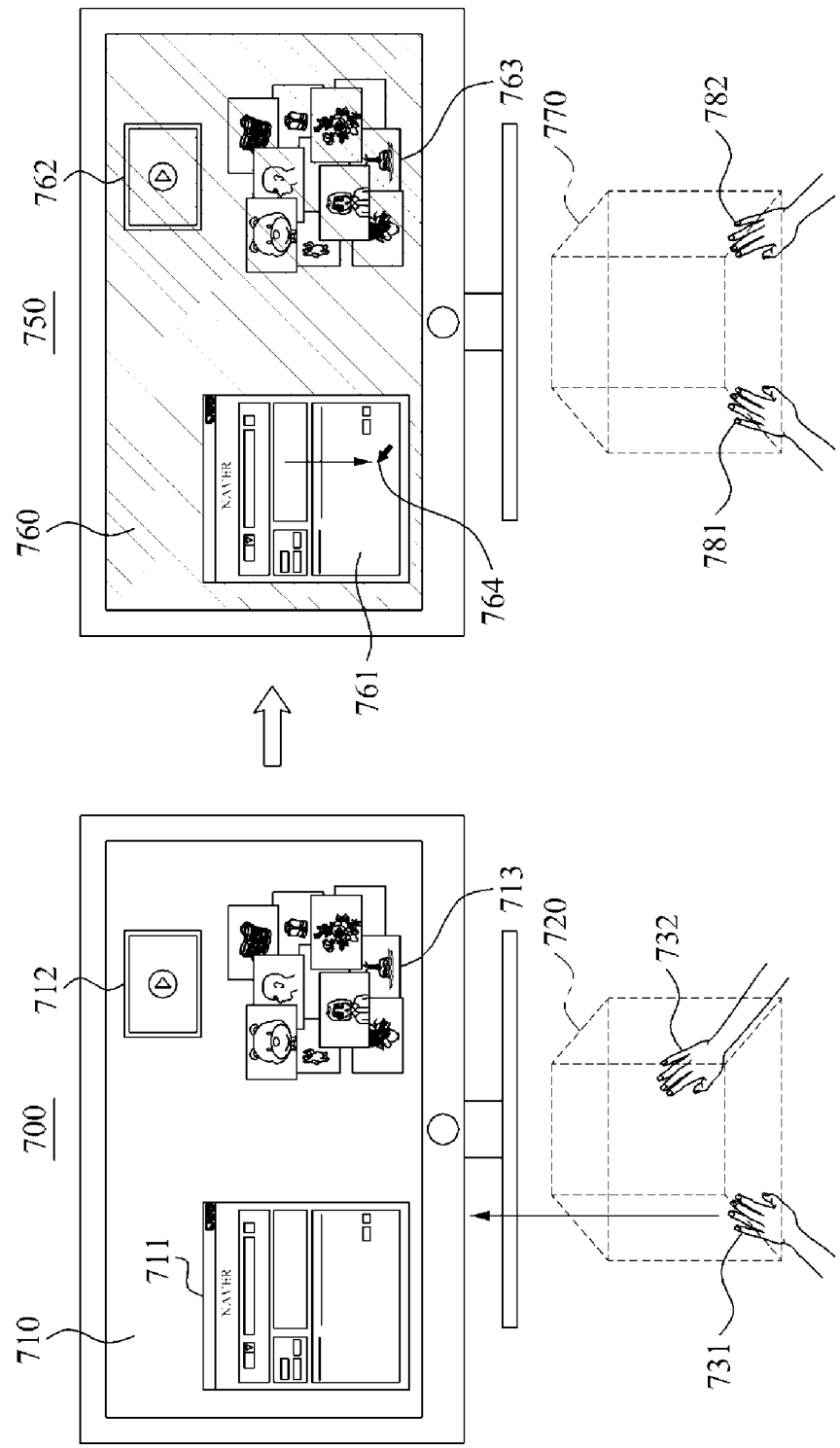
FIG. 7 illustrates a fixed interaction according to example embodiments.

FIG. 7 illustrates a fixed interaction according to example embodiments.

Referring to FIG. 7, in a state 700 before the motion information corresponding to the high precision interaction is recognized, the interface control apparatus 200 may display at least one UI object, for example, UI objects 711, 712, and 713 included in a 2D/3D GUI 710 on a display screen.

As a result of analyzing the image information, when the motions of moving both hands 731 and 732 of the user to the front of the user and stopping either hand 731 for longer than the reference time are recognized, the interface control apparatus 200 may generate the motion information regarding the motions. Here, since the motion information corresponds to the high precision interaction, the interface control apparatus 200 may control the 2D/3D GUI 710 based on the motion information.

Depending on embodiments, the interface control apparatus 200 may calculate and generate an ROI 720 corresponding to a position of the hand of the user. Here, the high precision interaction may include a motion of the user of moving both hands 731 and 732 into the ROI 720 and a motion of the user of stopping either hand 731 for longer than the reference time.

Referring to a state 750 after the motion information corresponding to the high precision interaction is recognized, the interface control apparatus 200 may indicate an operation region 761 corresponding to a position of a stopped hand 781 of both hands 781 and 782.

Here, the interface control apparatus 200 may display the other region except the operation region 761 in a 2D/3D GUI 760 in a dark color. For example, UI objects 762 and 763 located in the other region than the operation region 761 may be displayed in a dark color.

In addition, when the operation region 761 is displayed, the interface control apparatus 200 may control the 2D/3D GUI 760 such that a control point is moved corresponding to a movement of the other hand 782 of both hands.

Depending on embodiments, the interface control apparatus 200 may display the operation region 761 corresponding to the position of the hand 781 being stopped out of both hands 781 and 782 located in the ROI 770.

Referring back to FIG. 2, the processor 202 may generate gaze information regarding the gaze 221 of the user 220 based on the image information.

The processor 202 may extract head position information regarding a position of a head of the user 220 and head rotation information regarding rotation of the head, from the image information. Also, the processor 202 may generate the gaze information based on the head position information and the head rotation information.

The processor 202 may extract the head position information from the image information using a modified census transform (MCT)-based ADABOOST method. In addition, the processor 202 may extract the head rotation information from the image information using an active shape model (ASM).

The controller 203 may control the 2D/3D GUI 230 based on the motion information regarding the hand 222 of the user 220 and the gaze information regarding the gaze 221 of the user 220.

When the gaze 222 of the user 220 corresponds to the position of the motion picture replaying UI object 232 of the 2D/3D GUI 230 and, in addition, the motion of the hand 222 corresponds to the motion of playing the motion picture replaying UI object 232, that is, the play interaction, the controller 203 may control the 2D/3D GUI 230 such that the motion picture replaying UI object 232 is replayed.

A database according to an embodiment may store a plurality of interactions based on the motion information and the gaze information. When any interaction corresponding to the gaze information and the motion information exists among the plurality of interactions, the controller 203 may control the 2D/3D GUI 230 based on the interaction corresponding to the gaze information and the motion information.

Hereinafter, the interaction using the gaze 221 of the user 220 will be described in detail with reference to FIG. 8.

Figure 8:
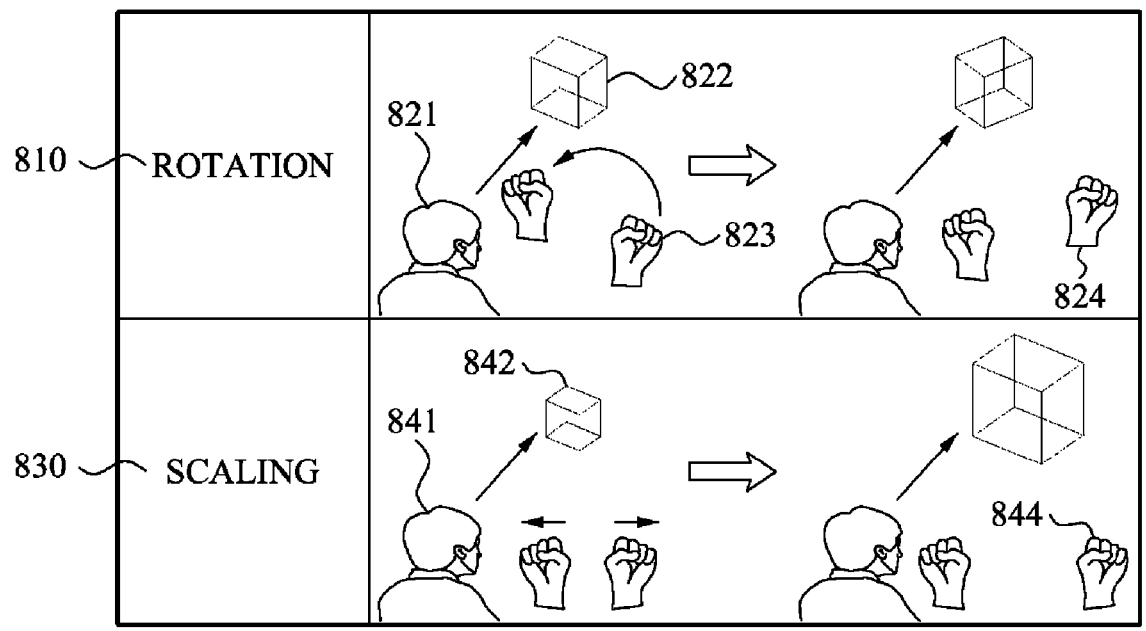
FIG. 8 illustrates an interaction using a gaze of a user according to example embodiments.

FIG. 8 illustrates an interaction using a gaze of a user according to example embodiments.

Referring to FIG. 8, a plurality of interactions 810 and 830 using a gaze of a user are illustrated as a table.

The plurality of interactions 810 and 830 that uses the gaze of the user may include at least one of a rotation interaction 810 and a scaling interaction 830.

According to an embodiment, the rotation interaction 810 may include a series of motions of the user, that is, a gaze stopping motion of stopping a gaze 821 for a predetermined time, a hands closing motion 823 of closing both hands, and a hands rotating motion 824 of rotating the closed hands.

For example, as a result of analyzing the image information, when the series of motions including the gaze stopping motion, the hands closing motion 823, and the hands rotating motion 824 are recognized, the interface control apparatus 200 may generate the motion information regarding the series of motions. Here, since the motion information corresponds to the rotation interaction 810, the interface control apparatus 200 may control the 2D/3D GUI based on the motion information. Specifically, the interface control apparatus 200 may control the 2D/3D GUI such that a UI object 822 corresponding to the gaze 821 of the user, out of at least one UI object on the 2D/3D GUI, is rotated by an angle correspond the hands rotating motion 824 of the closed hands of the user.

The scaling interaction 830 may include a series of motions of the user, that is, a gaze stopping motion of stopping a gaze 841 for a predetermined time and a hands closing motion 843 of closing both hands, and a hands separating motion 844 of separating the closed hands from each other. Also, the scaling interaction 830 may include a series of motions, that is, the hands closing motion 843 and a hands collecting motion of collecting both hands to each other.

For example, as a result of analyzing the image information, when the series of motions including the gaze stopping motion, the hands closing motion 843, and the hands separating motion 844 or the series of motions including the hands closing motion 843 and the hands collecting motion are recognized, the interface control apparatus 200 may generate the motion information regarding the series of motions. Here, since the motion information corresponds to the scaling interaction 830, the interface control apparatus 200 may control the 2D/3D GUI based on the motion information. Specifically, the interface control apparatus 200 may control the 2D/3D GUI such that a UI object 842 corresponding to the gaze 841 of the user, out of at least one UI object on the 2D/3D GUI, is size-transformed, that is, enlarged or reduced corresponding to a distance by which the closed hands are separated or collected.

Although the plurality of interactions using the gaze of the user, including the rotation interaction 810 and the scaling interaction 830, have been explained according to an example embodiment, the present invention is not limited thereto.

Referring back to FIG. 2, when the gaze information and the motion information correspond to the high precision interaction, the controller 203 may display the operation region corresponding to the gaze information and the motion information. Also, the controller 203 may control the 2D/3D GUI within the operation region.

The high precision interaction using the gaze 221 of the user 220 may include a motionless gaze stopping motion wherein the user 220 stops the gaze without moving for longer than a reference time.

For example, as a result of analyzing the image information, when the motionless gaze stopping motion of the user 220 is recognized, the processor 202 may generate gaze information regarding the motionless gaze stopping motion. Here, since the gaze information corresponds to the high precision interaction, the controller 230 may control the 2D/3D GUI 230. Specifically, the controller 203 may control the 2D/3D GUI 230 such that a region corresponding to the gaze 221 of the user 220 in the 2D/3D GUI 230 is displayed as an adjustment region and that a control point within the adjustment region is moved corresponding to the position of the hand 222 of the user 220.

Hereinafter, the high precision interaction using the gaze 221 of the user 220 will be described in detail with reference to FIGS. 9 and 10.

Figure 9:
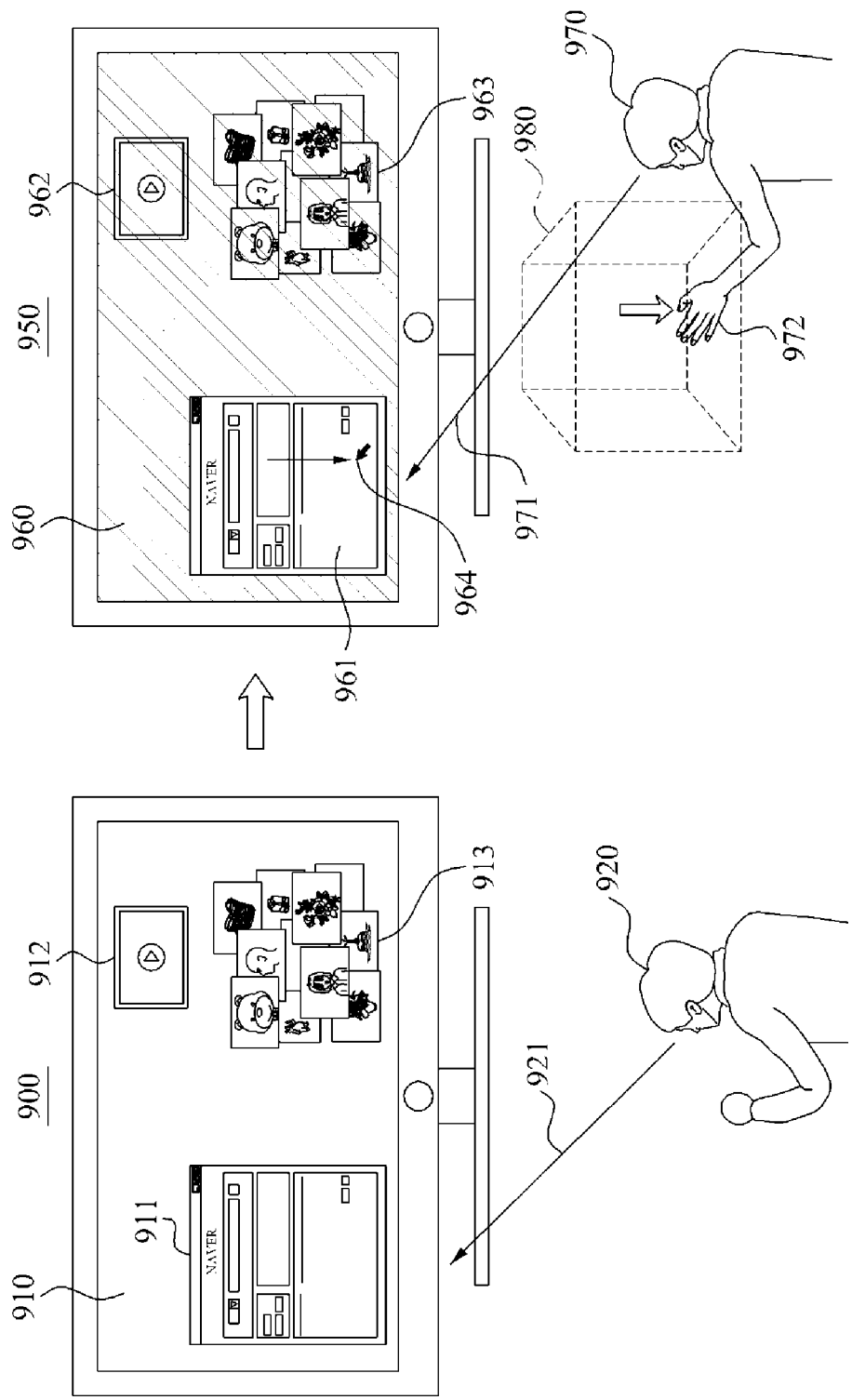
FIG. 9 illustrates a fixed interaction using a gaze of a user according to example embodiments.

FIG. 9 illustrates a fixed interaction using a gaze of a user according to example embodiments.

Referring to FIG. 9, in a state 900 before the gaze information and the motion information corresponding to the high precision interaction are recognized, the interface control apparatus 200 may display at least one UI object, for example, UI objects 911, 912, and 913 included in a 2D/3D GUI 910 on a display screen.

When a motionless gaze stopping motion wherein a user 920 stops a gaze 921 without moving for longer than a reference time is recognized as a result of analyzing the image information, the interface control apparatus 200 may generate gaze information regarding the motionless gaze stopping motion. Here, since the gaze information corresponds to the high precision interaction, the interface control apparatus 200 may control the 2D/3D GUI 910 based on the gaze information.

Referring to a state 950 after the gaze information and the motion information corresponding to the high precision interaction are recognized, the interface control apparatus 200 may display an operation region 961 corresponding to a gaze 971 of a user 970. Depending on embodiments, the interface control apparatus 200 may display the other region except the operation region 961 in a 2D/3D GUI 960 in a dark color. For example, UI objects 962 and 963 located in the other region except the operation region 961 may be displayed in a dark color.

In addition, when the operation region 961 is displayed, the interface control apparatus 200 may control the 2D/3D GUI 960 such that a control point is moved corresponding to a movement of a hand 972 of the user 970.

The interface control apparatus 200 may calculate and generate an ROI 980 in a position of the hand 972. Also, the interface control apparatus 200 may control the 2D/3D GUI 960 such that a control point within the ROI 980 is moved corresponding to the movement of the hand 972.

Figure 10:
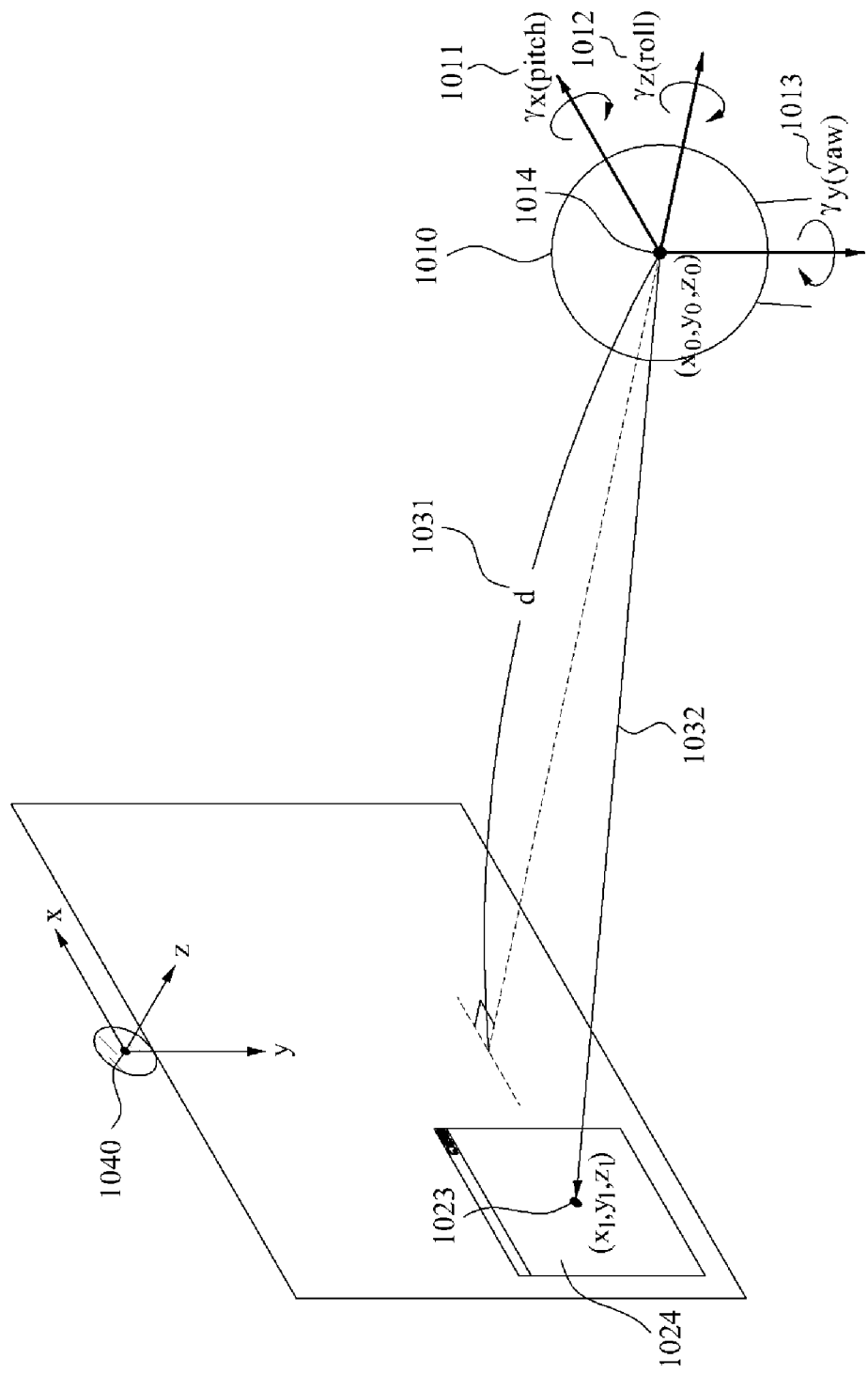
FIG. 10 illustrates an operation region according to example embodiments.

FIG. 10 illustrates an operation region according to example embodiments.

Referring to FIG. 10, an interface control apparatus according to an embodiment may extract a rotation angle of a head 1010 of a user from image information, and calculate central points $(x_1, y_1, z_1)$ 1023 of an operation region 1024 using the rotation angle of the head 1010.

Here, the interface control apparatus 200 may calculate the central points $(x_1, y_1, z_1)$ 1023 of the operation region 1024 using [Equation 3] through [Equation 6] as follows.

$$d = \sqrt{x_0^2 + y_0^2 + z_0^2} \qquad \text{[Equation 3]}$$

wherein, d(1031) denotes a distance from a display apparatus to the head 1010 of the user. A position of the head 1010 may be denoted by a coordinate value $(x_o, y_o, z_o)$ with respect to a coordinate axis 1040.

$$x_1 = d \times \cos(rx) \qquad \text{[Equation 4]}$$

$$y_1 = d \times \cos(ry) \qquad \text{[Equation 5]}$$

$$z_1 = d \times \cos(rz) \qquad \text{[Equation 6]}$$

wherein, rx 1011 denotes a pitch value of the head 1010, ry 1013 denotes a yaw value of the head 1010, and a rz 1012 denotes a roll value of the head 1010.

The interface control apparatus 200 may display the operation region by adding predetermined values dx, dy, and dz to the calculated central point $(x_1, y_1, z_1)$ 1023.

Referring back to FIG. 2, the interface control apparatus 200 may further include a generator 204 and an outputter 205.

The generator 204 may generate the 2D/3D GUI 230 based on the image information.

The outputter 205 may output the 2D/3D GUI 230 to a display apparatus 240.

Figure 11:
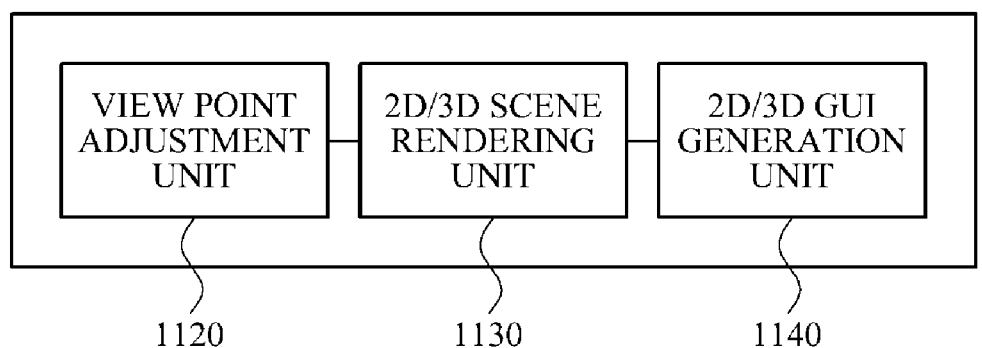
FIG. 11 illustrates a structure of a generator of an interface control apparatus according to example embodiments.

FIG. 11 illustrates a structure of a generator 1110 of an interface control apparatus according to example embodiments. For example, the generator 1110 may be included in interface control apparatus 200.

Referring to FIG. 11, the generator 1110 may include a view point adjustment unit 1120, a 2D/3D scene rendering unit 1130, and a 2D/3D GUI generation unit 1140.

The view point adjustment unit 1120 may extract information on positions of a left eye and a right eye of a user, from image information received from a sensor. In addition, the view point adjustment unit 1120 may adjust a position of a left view point corresponding to the left eye position and a position of a right view point corresponding to the right eye position.

When a plurality of users exist within a sensing range of the sensor, the view point adjustment unit 1120 may determine whether a main user that inputs a control start interaction exists among the plurality of users.

When the main user exists among the plurality of users, the view point adjustment unit 1120 may extract the information on the left eye position and the right eye position of the main user, adjust the left view point position corresponding to the position of the left eye of the main user, and adjust the right view point position corresponding to the position of the right eye of the main user.

When the main user does not exist, the view point adjustment unit 120 may extract information on an average position of left eyes of the plurality of users and information on an average position of right eyes of the plurality of users, adjust the left view point position corresponding to the average position of the left eyes, and adjust the right view point position corresponding to the average position of the right eyes.

The 2D/3D rendering unit 1130 may render a left 2D/3D scene based on the left view point position. Also, the 2D/3D rendering unit 1130 may render a right 2D/3D scene based on the right view point position.

The 2D/3D GUI generation unit 1140 may generate the 2D/3D GUI by combining the rendered left 2D/3D scene and the rendered right 2D/3D scene.

Hereinafter, a 2D/3D GUI according to example embodiments of the present invention will be described with reference to FIGS. 12 and 13.

Figure 12:
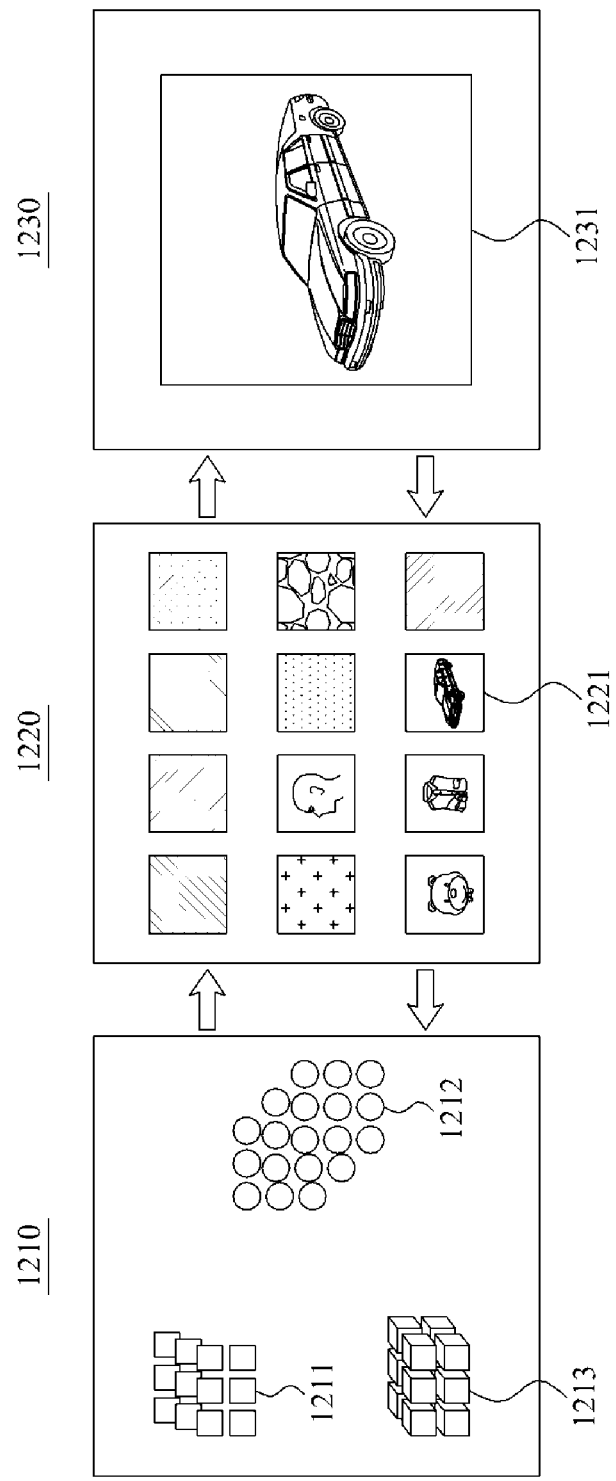
FIG. 12 illustrates a 2-dimensional or 3-dimensional graphical user interface (2D/3D GUI) according to example embodiments.

FIG. 12 illustrates a 2D/3D GUI according to example embodiments.

Referring to FIG. 12, the 2D/3D GUI may display at least one UI object in at least one method of a 2D/3D cube view 1210, a 2D/3D thumbnail view 1220, and a 2D/3D slide view.

According to the 2D/3D cube view 1210 method, at least one UI object, for example, UI objects 1211, 1212, and 1213 are displayed in the cube form. The 2D/3D thumbnail view 1220 method may display at least one UI object 1221 in the form of a thumbnail image. The 2D/3D slide view 1230 method may display at least one UI object 1231 in the form of a slide.

When motion information corresponding to a view conversion interaction is recognized, the interface control apparatus according to an example embodiment may convert a view type into any one of the 2D/3D cube view 1210, the 2D/3D thumbnail view 1220, and the 2D/3D slide view 1230. The view conversion interaction may be the scaling interaction.

Figure 13:
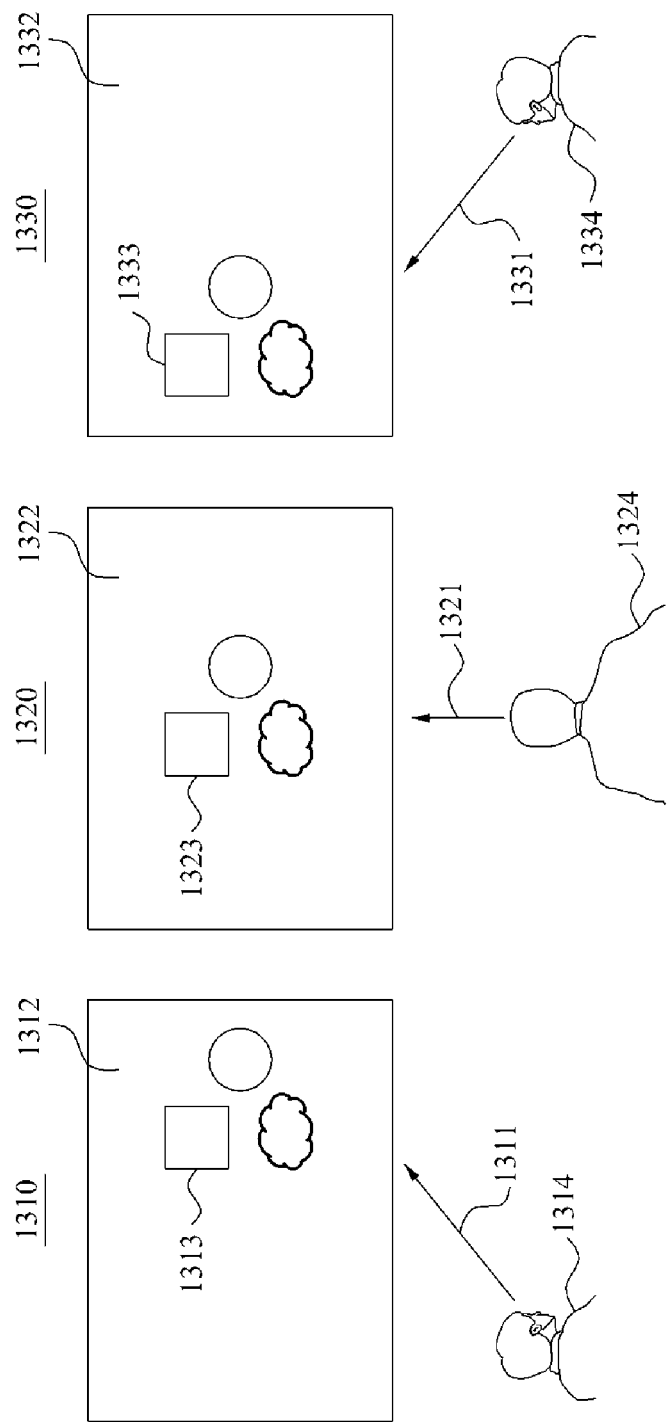
FIG. 13 illustrates an operation of an interface control apparatus controlling a 2D/3D GUI in accordance with a position of a user, according to example embodiments.

FIG. 13 illustrates an operation of an interface control apparatus controlling a 2D/3D GUI in accordance with a position of a user, according to example embodiments.

Referring to FIG. 13, the interface control apparatus 200 may extract, from image information, information on positions of users 1314, 1324, and 1334 and directions of gazes 1311, 1321, and 1331 of the users 1314, 1324, and 1334.

Here, the interface control apparatus 200 may adjust directions of view points related to 2D/3D GUIs 1310, 1320, and 1330, based on the information on the directions of the gazes 1311, 1321, and 1331 of the users 1314, 1324 and 1334.

For example, when the use 1314 is disposed on the left of a display apparatus 1312 and the gaze 1311 of the user 1314 is directed to the right of the display apparatus 1312, the interface control apparatus 200 may display a UI object 1313 of the 2D/3D GUI 1310 on the right of the 2D/3D GUI 1310.

When the user 1324 is disposed in front of a display apparatus 1322 and the gaze 1321 of the user 1324 is directed to the front of the display apparatus 1322, the interface control apparatus 200 may display a UI object 1323 of the 2D/3D GUI 1320 in the center of the 2D/3D GUI 1320.

Additionally, when the user 1334 is disposed on the right of a display apparatus 1332 and the gaze 1331 of the user 1334 is directed to the left of the display apparatus 1332, the interface control apparatus 200 may display a UI object 1333 of the 2D/3D GUI 1330 on the left of the 2D/3D GUI 1330.

Figure 14:
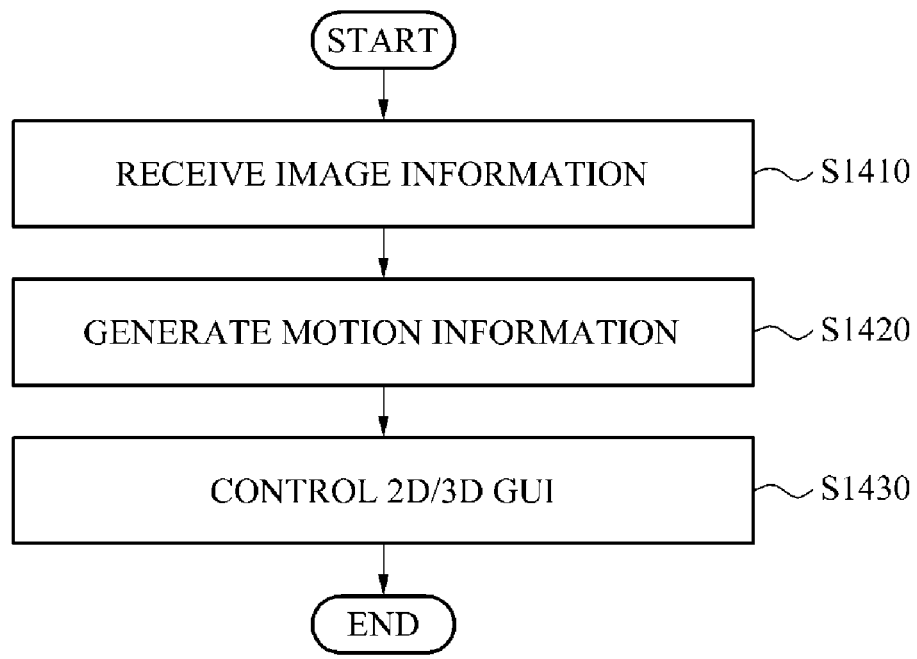
FIG. 14 illustrates a flowchart explaining an interface control method according to example embodiments.

FIG. 14 illustrates a flowchart explaining an interface control method according to example embodiments.

Referring to FIG. 14, the interface control method receives image information including a depth image related to a user from a sensor, in operation 1410.

The interface control method generates at least one of motion information regarding a hand motion of a user and gaze information regarding a gaze of the user, based on the image information in operation 1420.

The interface control method may recognize the hand motion of the user by analyzing the received image information and accordingly generate the motion information regarding the hand motion.

Depending on embodiments, the interface control method may extract information on a position of the hand of the user from the image information using the mean shift. Also, the interface control method may extract information on a posture of the hand from the image information using ADABOOST-based shape matching which features a hue moment according to a level set. The interface control method may extract information on a motion path of the hand from the image information using an MSE.

The interface control method may calculate an ROI based on the received image information. In addition, the interface control method may generate information on the hand motion within the calculated ROI.

When the same ROI is necessary regardless of a position of the user, the ROI indicates a partial region of the image received from the sensor to generate the motion information regarding the motion of the hand. Depending on embodiments, the interface control method may not generate the motion information regarding the motion of the hand performed out of the ROI.

The interface control method may calculate the ROI by calculating a width ($ROI_{width}$) and a height ($ROI_{height}$) of the 250.

The interface control method may calculate a depth difference value between a current frame and at least one previous frame of the depth image, and generate the motion information based on the calculated depth difference value.

The interface control method may control the 2D/3D GUI based on the motion information in operation 1430.

The 2D/3D GUI may display at least one UI object.

Depending on embodiments, when the hand of the user is disposed corresponding to a position of a motion picture replaying UI object of the 2D/3D GUI according to the motion information and, in addition, the hand motion corresponds to the motion of playing the motion picture replaying UI object, that is, a play interaction, the interface control method may control the 2D/3D GUI such that the motion picture replaying UI object is replayed.

The interface control method may start or end controlling the 2D/3D GUI in accordance with a control start interaction signaling start of the control of the 2D/3D GUI and a control end interaction signaling end of the control of the 2D/3D GUI.

In other words, when the motion information corresponds to the control start interaction, the interface control method may start controlling the 2D/3D GUI. When the motion information corresponds to the control end interaction, the interface control method may end controlling the 2D/3D GUI.

When any interaction of a plurality of interactions corresponds to the motion information, the interface control method When any of the plurality of interactions corresponds to the motion information, the interface control method may control the 2D/3D GUI 230 based on the interaction corresponding to the motion information.

In addition, when no interaction of the plurality of interactions corresponds to the motion information, the interface control method may control a movement of a control point of the 2D/3D GUI based on the motion information.

When the motion information corresponds to a high precision interaction, the interface control method may display an operation region corresponding to the motion information. In addition, the interface control method may control the 2D/3D GUI within the operation region.

The interface control method may define a control region of the 2D/3D GUI as a predetermined partial region rather than the entire 2D/3D GUI. Here, the operation region denotes the predetermined region within which the control range is limited.

Depending on embodiments, the interface control method may indicate the operation region by displaying the other region of the 2D/3D GUI but the operation region in a dark color. Alternatively, the interface control method may indicate the operation region by enlarging the operation region to a predetermined size.

The high precision interaction may include a motion of the user of moving both hands to a front of the user and a motion of the user of stopping any one of both hands for longer than a reference time.

For example, as a result of analyzing the image information, when the motions the user of moving both hands to the front of the user and stopping either hand for longer than the reference time are recognized, the interface control method may generate the motion information regarding the motions. Here, since the motion information corresponds to the high precision interaction, the interface control apparatus 200 may control the 2D/3D GUI based on the motion information. Specifically, the interface control method may control the 2D/3D GUI such that a region of the 2D/3D GUI, corresponding to a position of one hand stopped for longer than the reference time, is displayed as an adjustment region and that a control point within the adjustment region is moved corresponding to a position of the other hand.

The interface control method may generate gaze information regarding the gaze of the user based on the image information.

The interface control method may extract head position information regarding a position of a head of the user and head rotation information regarding rotation of the head of the user, from the image information. Also, the interface control method may generate gaze information based on the head position information and the head rotation information.

The interface control method may extract the head position information from the image information using an MCT-based ADABOOST method. In addition, the interface control method may extract the head rotation information from the image information using an ASM.

The interface control method may control the 2D/3D GUI based on the motion information regarding the hand motion of the user and the gaze information regarding the gaze of the user.

When the gaze of the user corresponds to a position of the motion picture replaying UI object of the 2D/3D GUI and, in addition, the hand motion corresponds to a motion of playing the motion picture replaying UI object, that is, a play interaction, the interface control method may control the 2D/3D GUI such that the motion picture replaying UI object is replayed.

A database according to an embodiment may store a plurality of interactions based on the motion information and the gaze information. When any interaction corresponding to the gaze information and the motion information exists among the plurality of interactions, the interface control method may control the 2D/3D GUI based on the interaction corresponding to the gaze information and the motion information.

When the gaze information and the motion information correspond to the high precision interaction using the gaze of the user, the interface control method may display the operation region corresponding to the gaze information and the motion information. Also, the interface control method may control the 2D/3D GUI within the operation region.

The high precision interaction using the gaze of the user may include a motionless gaze stopping motion of the user of stopping the gaze for longer than a reference time.

For example, when the motionless gaze stopping motion of the user is recognized as a result of analyzing the image information, the interface control method may generate gaze information regarding the motionless gaze stopping motion. Here, since the gaze information corresponds to the high precision interaction, the interface control method may control the 2D/3D GUI. Specifically, the interface control method may control the 2D/3D GUI such that a region corresponding to the gaze of the user in the 2D/3D GUI is displayed as an adjustment region and that a control point within the adjustment region is moved corresponding to the position of the hand of the user.

The interface control method may generate the 2D/3D GUI based on the image information. In addition, the interface control method may output the 2D/3D GUI to a display apparatus.

The interface control method may extract information on positions of a left eye and a right eye of the user, from the image information received from the sensor. In addition, the interface control method may adjust a position of a left view point corresponding to the left eye position and a position of a right view point correspond the right eye position.

When a plurality of users exist within a sensing range of the sensor, the interface control method may determine whether a main user that inputs a control start interaction exists among the plurality of users.

When the main user exists among the plurality of users, the interface control method may extract the information on the left eye position and the right eye position of the main user, adjust the left view point position corresponding to the position of the left eye of the main user, and adjust the right view point position corresponding to the position of the right eye of the main user.

When the main user does not exist, the interface control method may extract information on an average position of left eyes of the plurality of users and information on an average position of right eyes of the position users, adjust the left view point position corresponding to the average position of the left eyes, and adjust the right view point position corresponding to the average position of the right eyes.

The interface control method may render a left 2D/3D scene based on the left view point position. Also, interface control method may render a right 2D/3D scene based on the right view point position.

The interface control method may generate the 2D/3D GUI by combining the rendered left 2D/3D scene and the rendered right 2D/3D scene.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files including higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus for controlling an interface, comprising:
    a sensor configured to obtain a image related to a user; and
    a processor configured to
        determine a resolution of a region of interest (ROI) based on a distance between the user and the sensor, a resolution of the sensor, and a size of an ROI window in the air,
        generate information regarding a user input based on the resolution of the ROI, and
        control the interface based on the information.

2. The apparatus of claim 1, wherein the resolution of the ROI is further calculated a size of a field of view of the sensor corresponding to the distance between the user and the sensor.

3. The apparatus of claim 1, wherein a width of the resolution of the ROI is calculated based on Equation 1 and a height of the resolution of the ROI is calculated based on Equation 2 as follows:

$$ROI_{width} = \frac{K_{width} \times \text{image}_{width}}{D_{cur} \times \tan(FoV_{width})} \quad \text{[Equation 1]}$$

$$ROI_{height} = \frac{K_{height} \times \text{image}_{height}}{D_{cur} \times \tan(FoV_{height})} \quad \text{[Equation 2]}$$

wherein $D_{cur}$ is the distance between the user and the sensor,

Image$_{width}$ and Image$_{height}$ are a width and a height of the image,

FoV$_{width}$ and FoV$_{height}$ are a width and a height of a field of view of the sensor, and $K_{width}$ and $K_{height}$ are a width and a height of a ROI window in the air.

4. The apparatus of claim 1, wherein the information comprises either one or both of motion information regarding a hand motion within the ROI and gaze information regarding a gaze of the user.

5. The apparatus of claim 1, wherein the processor is further configured to calculate a depth difference value between a current frame and at least one previous frame of the depth image, and generate motion information based on the depth difference value.

6. The apparatus of claim 1, wherein the processor is further configured to extract, from the image, head position information regarding a position of a head of the user and head rotation information regarding rotation of the head of the user, and generate gaze information based on the head position information and the head rotation information.

7. The apparatus of claim 1, wherein the processor is further configured to start controlling the interface in response to the information corresponding to a control start interaction, and end controlling of the interface in response to the information corresponding to a control end interaction.

8. The apparatus of claim 7, wherein the control start interaction comprises either one or both of a motion of raising a hand of the user and a motion of pushing the hand of the user.

9. The apparatus of claim 7, wherein the control end interaction comprises a motion of lowering a hand of the user.

10. The apparatus of claim 1, wherein the processor is further configured to display an operation region corresponding to the information and controls the interface within the operation region in response to the information corresponding to a high precision interaction.

11. The apparatus of claim 1, wherein the processor is further configured to
    control the interface in response to there being an interaction corresponding to any one or any combination of any two or more of an execution interaction, a cancel interaction, a drag-and-drop interaction, a scrolling interaction, a rotation interaction, and a scaling interaction, and control movement of a control point of the interface in response to there being no interaction corresponding to the any one or any combination of any two or more of an execution interaction, a cancel interaction, a drag-and-drop interaction, a scrolling interaction, a rotation interaction, and a scaling interaction.

12. The apparatus of claim 1, wherein the image comprises any one or any combination of any two or more of a depth image related to the user, a color image related to the user, and an IR image related to the user.

13. The apparatus of claim 1, wherein the processor is further configured to:
   adjust a position of a left view point corresponding to a position of a left eye of the user in the image;
   adjust a position of a right view point corresponding to a position of a right eye of the user in the image;
   render a left scene based on the position of the left view point;
   render a right scene based on the position of the right view point; and
   combine the left scene and the right scene to generate the interface.

14. The apparatus of claim 13, wherein, in response to users being within a sensing range of the sensor and, among the users, a main user existing that inputs a control start interaction, the processor extracts information on a left eye position regarding a left eye of the main user and on a right eye position regarding a right eye of the main user, adjusts the left view point position corresponding to the left eye position of the main user, and adjusts the right view point position corresponding to the right eye position of the main user.

15. The apparatus of claim 13, wherein, in response to users being within a sensing range of the sensor and, among the users, a main user not existing, the processor extracts information on an average position of left eyes of the users and an average position of right eyes of the users, adjusts the left view point position corresponding to the average position of the left eyes, and adjusts the right view point position corresponding to the average position of the right eyes.

16. The apparatus of claim 13, wherein, in response to users being within a sensing range of the sensor, the processor extracts information on an average position of left eyes of the users and an average position of right eyes of the users, adjusts the left view point position corresponding to the average position of the left eyes, and adjusts the right view point position corresponding to the average position of the right eyes.

17. The apparatus of claim 1, wherein the processor is further configured to display at least one UI object based on any one or any combination of any two or more of a cube view, a thumbnail view, and a slide view.

18. A method of controlling an interface, comprising:
   obtaining a image related to a user from a sensor;
   determining a resolution of a region of interest (ROI) based on a distance between the user and the sensor, a resolution of the sensor, and a size of an ROI window in the air;
   generating information regarding a user input based on the resolution of the ROI; and
   controlling the interface based the information.

19. A non-transitory computer-readable storage medium storing instructions that, when executed by a processor, cause the processor to perform the method of claim 18.

* * * * *